J. HARPER.
PLOW ATTACHMENT.
APPLICATION FILED SEPT. 5, 1918.
1,287,006.
Patented Dec. 10, 1918.
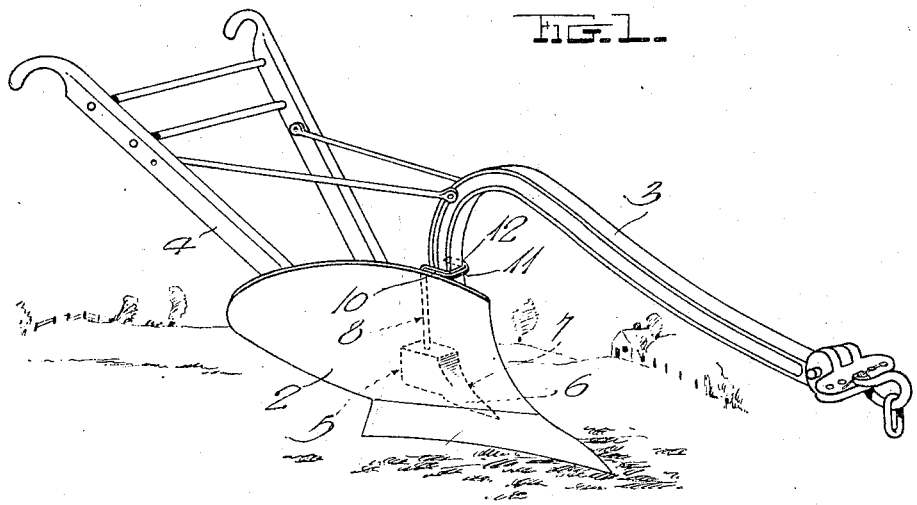
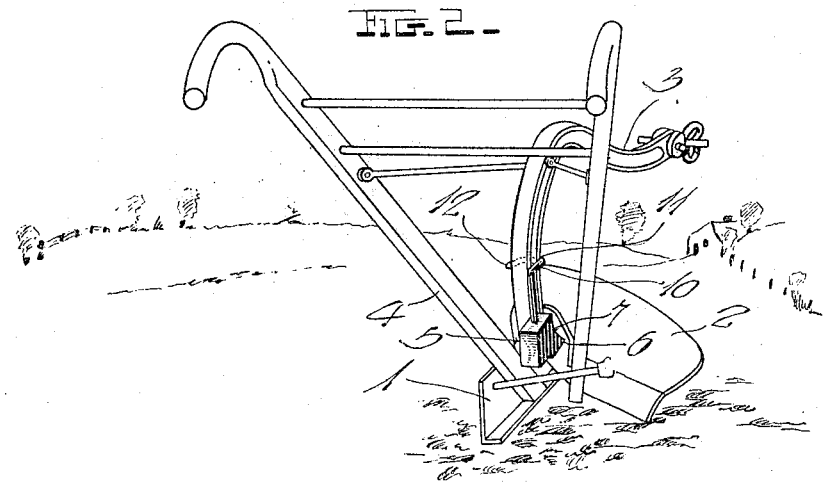
Witness
H. Woodard
Inventor
JAMES HARPER
By H. B. Wilson &co
Attorneys

UNITED STATES PATENT OFFICE.

JAMES HARPER, OF OZARK, MISSOURI.

PLOW ATTACHMENT.

1,287,006.  Specification of Letters Patent.  Patented Dec. 10, 1918.

Application filed September 5, 1918. Serial No. 252,763.

*To all whom it may concern:*

Be it known that I, JAMES HARPER, a citizen of the United States, residing at Ozark, in the county of Christian and State of Missouri, have invented certain new and useful Improvements in Plow Attachments; and I do declare the following to be a full, clear, and exact description of the invention, such as will enable others skilled in the art to which it appertains to make and use the same.

My invention relates to improvements in agricultural implements and more particularly to plows, the object being to provide a simply constructed, inexpensive, easily attached and highly efficient weight for turning plows, the weight being adapted for disposition between the land side and the mold board and serving to more effectively retain the plow on the ground.

With the foregoing objects in view, the invention resides in the novel construction and arrangement of parts hereinafter fully described, claimed and illustrated.

Figures 1 and 2 are perspective views of a plow looking in different directions and showing the invention attached.

Fig. 3 is a perspective view of the device detached from the plow.

In the drawings above briefly described, a common form of walking plow is shown, said plow consisting of the land side 1, mold board 2, beam 3 and handles 4, the beam being anchored at its lower end in the angle between the land side and the mold board in the usual manner and extending upwardly and then forwardly from the plow proper.

The present invention consists of a weight 5 which may be formed of cast metal or constructed in any other preferred manner, the front end of said weight being pointed at 6 and downwardly curved at 7 for snug reception in the angle between the mold board and the land side, the front and rear ends of the weight being preferably offset vertically to a slight extent as shown. An opening is formed through the rear portion of the weight 5 and a vertical hanger rod 8 passes slidably through said opening, the lower end of said rod having thereon an adjusting nut 8 contacting with the lower side of the weight, while the upper end of the rod is bent forwardly at 10, laterally at 11, and then rearwardly at 12. This formation constitutes a hook to embrace the vertical portion of the plow beam 3 and to rest upon the mold board 2, thus effectively supporting the weight 5 in position. On plows of different sizes, the nut 9 may be adjusted so as to obtain the most practical positioning of the weight.

By constructing the device as shown and described, it may be easily manufactured and placed upon the market at minimum costs, it may be quickly and easily attached to numerous forms of plows, and when installed will be highly efficient in retaining the plow in the ground and preventing lurching and jerking thereof. Since probably the best results are obtained from the exact construction shown, it may be followed, but within the scope of the invention as claimed, numerous minor changes may well be made.

I claim:

A weight for plows comprising a weight member and a hanger rod rising from said weight member, the upper end of said hanger rod being bent forwardly for contact with one side of the plow beam, being then bent laterally to abut the front edge of the beam and finally extending rearwardly to contact with the other side of the beam, the front end of said weight being pointed and curved downwardly on its upper side for snug reception between the mold board and the land side of the plow.

In testimony whereof I have hereunto set my hand.

JAMES HARPER.

Witnesses:
EMILY A. ROURKE,
MATTIE A. ADAMS.

Copies of this patent may be obtained for five cents each, by addressing the "Commissioner of Patents, Washington, D. C."